(12) United States Patent
Powers, Jr. et al.

(10) Patent No.: US 7,067,987 B2
(45) Date of Patent: Jun. 27, 2006

(54) ELECTRONIC BALLAST WITH CLOSED LOOP CONTROL USING COMPOSITE CURRENT AND VOLTAGE FEEDBACK AND METHOD THEREOF

(75) Inventors: Charles Dexter Powers, Jr., Hong Kong (HK); Robert S. Feldstein, Yonkers, NY (US)

(73) Assignee: Argent Electric, Inc., Chappaqua, NY (US)

( * ) Notice: Subject to any disclaimer, the term of this patent is extended or adjusted under 35 U.S.C. 154(b) by 143 days.

(21) Appl. No.: 10/809,948

(22) Filed: Mar. 26, 2004

(65) Prior Publication Data

US 2005/0212458 A1    Sep. 29, 2005

(51) Int. Cl.
*H05B 37/02*   (2006.01)
(52) U.S. Cl. .................. 315/219; 315/307; 315/224
(58) Field of Classification Search ............... 315/224, 315/307, DIG. 5, DIG. 7
See application file for complete search history.

(56) References Cited

U.S. PATENT DOCUMENTS

| 5,414,325 A | * | 5/1995 | Allison ..................... 315/158 |
| 5,515,261 A | | 5/1996 | Bogdan |
| 5,869,937 A | | 2/1999 | Konopka |
| 6,169,374 B1 | | 1/2001 | Chang |
| 2003/0001522 A1 | | 1/2003 | Newman |

* cited by examiner

*Primary Examiner*—David Vu
(74) *Attorney, Agent, or Firm*—Eliot Gerber

(57) ABSTRACT

An electronic control system especially for non-linear loads, such as high pressure sodium (HPS) lamps, includes an active power factor correction circuit (APFC). The system provides a power factor correction of above 0.95; total harmonic distortion (THD) below 5%; lamp crest factor (LCF) close to unity; efficient power consumption and reliable open circuit voltage (OCV) under all power line conditions. A ballast would include integrated circuits (ICs) and a four-arm transistor bridge which is directly driven by integrated circuits. The bridge generates reversal of polarity to the load. An approximate average current feedback is derived from a load current. A resistor divider in parallel with the load provides voltage feedback. The average current feedback and voltage feedback are added together to provide an approximation of power consumed by the load, without the complex circuitry required for a true power feedback of current multiplied by voltage. That composite feedback signal is transmitted to the integrated circuit (IC) which compares it with an internal reference voltage and which adjusts the IC output to minimize the error.

21 Claims, 2 Drawing Sheets

ELECTRONIC BALLAST WITH CLOSED LOOP CONTROL USING COMPOSITE CURRENT AND VOLTAGE FEEDBACK AND METHOD THEREOF

FIELD OF THE INVENTION

The present invention relates to electronic ballasts and especially to such ballasts for high luminance high intensity discharge (HID) lamps.

BACKGROUND OF THE INVENTION

A ballast is an electrical device which is used to provide power to a load, such as an electrical discharge lamp, and to regulate that power, both as to its voltage and current. The ballast provides high voltage to start a lamp, causing an arc to jump from one electrode to the other, by ionizing sufficient plasma (vapor) for the arc to be sustained and to grow. Once the arc is established the ballast allows the lamp to continue to operate by providing proper controlled power flow to the lamp.

In certain types of lamps and other non-resistive loads, the control of power presents special difficulties. For example, one type of high intensity discharge (HID) lamp is a high pressure sodium (HPS) lamp often used for street lighting. In HID lamps an arc is established between electrodes which causes a metallic vapor (xenon, sodium and mercury) to produce radiant energy in the form of visible light, generally without phosphors. The vapor is highly pressurized. HPS lamps are widely used, especially for street lighting, as they are energy efficient (many lumens per watt) and have a long service life, up to 40,000 hours. HPS lamps are also widely used in interior applications where color rendering is not a critical concern.

Ballasts for loads, such as HPS lamps, are generally either magnetic or electronic. Electronic ballasts are presently preferred by many users because, compared to magnetic ballasts, they improve lamp efficiency, reduce light "flicker", operate more quietly, are better able to regulate the power to the load and are better able to prevent adverse effects on the AC power supply system from the load.

In the operation of HPS lamps, and other HID lamps, the electrodes carry a high-voltage, high-frequency pulse to strike an arc and vaporize the vapor. The ballast must provide sufficient power to the lamp, from the AC source, to provide sufficient open circuit voltage (OVC) to permit polarity reversal without the arc being extinguished (quenched). The AC source is generally a symmetrical, usually sinusoidal, power source at 50/60 Hz.

The superiority of a suitable electronic ballast, compared to a magnetic ballast, is especially evident in the case of HPS lamps, especially those that are aged (have accumulated many service hours). A magnetic ballast is typically an inductance in series with a load, i.e., with an HPS lamp. It includes a "starter", which is a small pulse generator to strike the arc. The starter is usually connected to a tap on the inductor. The ballast may also include a transformer to match the AC line voltage to the required open circuit voltage (OCV) of the lamp.

The various requirements of a ballast, especially a ballast for HPS lamps, are set forth below, along with comments as to how well magnetic and electronic ballasts presently meet those requirements.

1. The ballast should provide the required lamp illumination level even when the voltage is reduced or raised. The power from the AC source often fluctuates widely. If the lamp were to throw off less light when the power (voltage level) falls, the lamp's illumination might be insufficient. For example a street lamp might not safely light up a street. The fixed impedance of a typical magnetic ballast is in series with the load, i.e., the lamp, and so the ballast, in order to provide a margin of safety against low voltage events, normally provides an excess of power and the lamps normally provide excessive light; This is costly in terms of power consumption and lamp life. When the voltage level is too high ("high line") even more power is consumed. If the power level declines ("low line"), even momentarily, the open circuit voltage (OCV) may fall below the lamp's requirement, especially for lamps with many hours of service, and the arc may be quenched. After quenching the lamps take a "restrike" interval to cool down before restarting. This may be a problem if a group of lamps has been simultaneously quenched, which may occur when an electrical grid is reconfigured and the voltage momentarily drops to a low-line condition. An ideal ballast would provide a nearly constant effective power equal to the nominal lamp power over the lifetime of the lamp, even under high-line and low-line conditions. Generally, magnetic ballasts fail to provide such power regulation or sufficient energy storage to avoid quenching on very brief voltage dips.

2. Power factor is the ratio of actual power (watts), to volts times amps from the AC power source. Magnetic ballasts typically use a large and expensive capacitor, as a line shunt, to compensate for the ballast's inductance, in order to achieve a higher power factor, for example above 0.95. Magnetic ballasts, when used with HID lamps result in substantial line current distortion, which reduces network efficiency and raises component temperatures, especially in the transformers. Electronic ballasts are able to achieve a high power factor, in the range of 0.95 to 0.99. To do so, the current which is drawn from the AC source should have a sinusoidal wave shape and it should be at most only a few degrees out of phase with the sinusoidal line voltage waveform of the AC supply. For that purpose—a power factor above 0.95—electronic ballasts typically utilize an active power factor correction (APFC) circuit. U.S. Pat. No. 5,515,261 to Bogdan; U.S. Pat. No. 6,169,374 to Chang and U.S. Pat. No. 5,869,937 to Konopka show power supply power factor correction circuits. U.S. Pat. No. 6,169,374 to Chang relates to an electronic ballast for power factor correction at a low cost. It uses a half-bridge inverter to power a fluorescent lamp and mentions both current feedback and voltage feedback. However "feedback" has many meanings and in U.S. Pat. No. 6,169,374 the "feedback" is a direct drive to the load. This is an open loop system. In the present invention, in contrast, a composite current/voltage feedback is fed to an IC (Integrated Circuit) which compares that feedback to a reference. It is a closed loop system.

3. In addition to a power factor correction, to provide a power factor preferably of 0.99 to 1.0, an electronic ballast should also provide the following:
    a. The ballast should provide line harmonics which are low, at least less than 20% and preferably less than 5%. The load should appear resistive to the AC line, reducing harmonic current. Total harmonic distortion (THD) is typically calculated using the first 30 harmonics of the fundamental frequency. Some electronic ballasts circuits having active power-factor correction (APFC) also seek to provide low-line current harmonics (see U.S. Patent application 20030001522 to Newman et al. and the references cited therein).

b. The ballast should be highly efficient, preferably above 90% and most preferably above 94% to reduce power consumption.
c. The ballast should provide lamp regulation with sufficient voltage to the lamp during low-line conditions and without a large safety margin, i.e., without excessive voltage during normal operation. Such lamp regulation reduces power consumption compared to less regulated ballasts.
d. The ballast should control power consumption during warm-up of the lamp. The warm-up period is between the start of ignition until the arc has obtained equilibrium. The warm-up time for a HPS lamp is typically several minutes. In the warm-up period the lamp resistance increases from a low value, for example 60 Ohms for a 400 W lamp, to a higher value, for example 400 Ohms, and the required voltage rises for example from 30V (volts) to 90V. The ballast should act as a power limiter during warm up to avoid excessive power system demand.
e. The ballast should provide the required minimum of open circuit voltage (OCV) under all line conditions, especially low-line conditions. The OCV of the lamp depends on its type, wattage, age, etc., but generally, for HPS lamps, it is in the range of 200V. If the OCV is not maintained the lamp arc will likely be quenched.
f. The ballast should provide reliable lamp ignition. In many magnetic ballasts the igniter is a separate external device which is less effective in its speed of restarting the arc ("restrike") and less robust and less reliable than an igniter which both physically and electrically is integral (internal) to an electronic ballast. Such an integral igniter may provide a rapid restrike, in seconds, if the lamp arc is quenched. The igniter provides the appropriate voltage across the electrodes to initiate spare discharge and sufficient current, at spark discharge, to force a spark to arc transition. For HPS lamps generally the igniter voltage should be over 2000V in the form of voltage pulses, for example pulses of 1 u s (microsecond) duration.
g. The ballast provides a controlled lamp frequency (less than 200 HZ to avoid acoustic resonance) which should be switched so that it is highly symmetric and reverses polarity at least every 10 ms. Generally, in electronic ballasts, the wave form is of a square wave form. The frequency should be below any acoustic resonance (standing pressure waves). If acoustic resonances are generated in an HID lamp, the arc may be distorted, the lamp life shortened and the tube wall may crack.
h. The ballast should provide a lamp crest factor (LCF) close to unity to allow for maximum lamp life, for example 40,000 service hours for an HPS lamp. The lamp crest factor is the ratio of peak current to RMS (average) lamp current at the equilibrium of the lamp. Generally HPS lamp manufacturers accept the highest ratio (peak rms) of 1.4:1 and the lamp crest factor should be below that ratio.

BRIEF SUMMARY OF THE INVENTION

In accordance with the present invention an electronic ballast, in prototype tests, displayed the following beneficial results:
1. it maintained a constant effective power source and maintained the open circuit voltage (OCV) to HPS lamps, under low-line and high-line conditions;
2. it had a power factor correction of above 0.95, using active power factor correction (APFS);
3. the total harmonic distortion (THD) was low, less than 5%;
4. the regulation of power to the load, i.e., the HPS lamp, was efficient, without excessive energy consumption;
5. the ignition of the arc of the lamps, under test, was reliable;
6. the lamp crest factor (LCF) was close to unity.

The ballast includes a four-transistor bridge which is a polarity-reverser to power a load with an approximate voltage square wave and a symmetric square current wave form. The ballast is a closed loop system which obtains an approximate current feedback signal, a voltage feedback signal and combines them by addition and not multiplication. The composite feedback signal is compared, by a single integrated circuit (IC), to an internal fixed reference voltage. The IC controls power to the lamp. Lamp polarity-reversal is controlled separately from loop power control. The use of current plus voltage feedback is clearly applicable to many non-lamps systems, such as motor controls or LED Illuminators which have large temperature coefficients. This will be obvious to one skilled in the art.

BRIEF DESCRIPTION OF THE DRAWINGS

In the accompanying drawing.

DETAILED DESCRIPTION OF THE INVENTION

Figure 1:
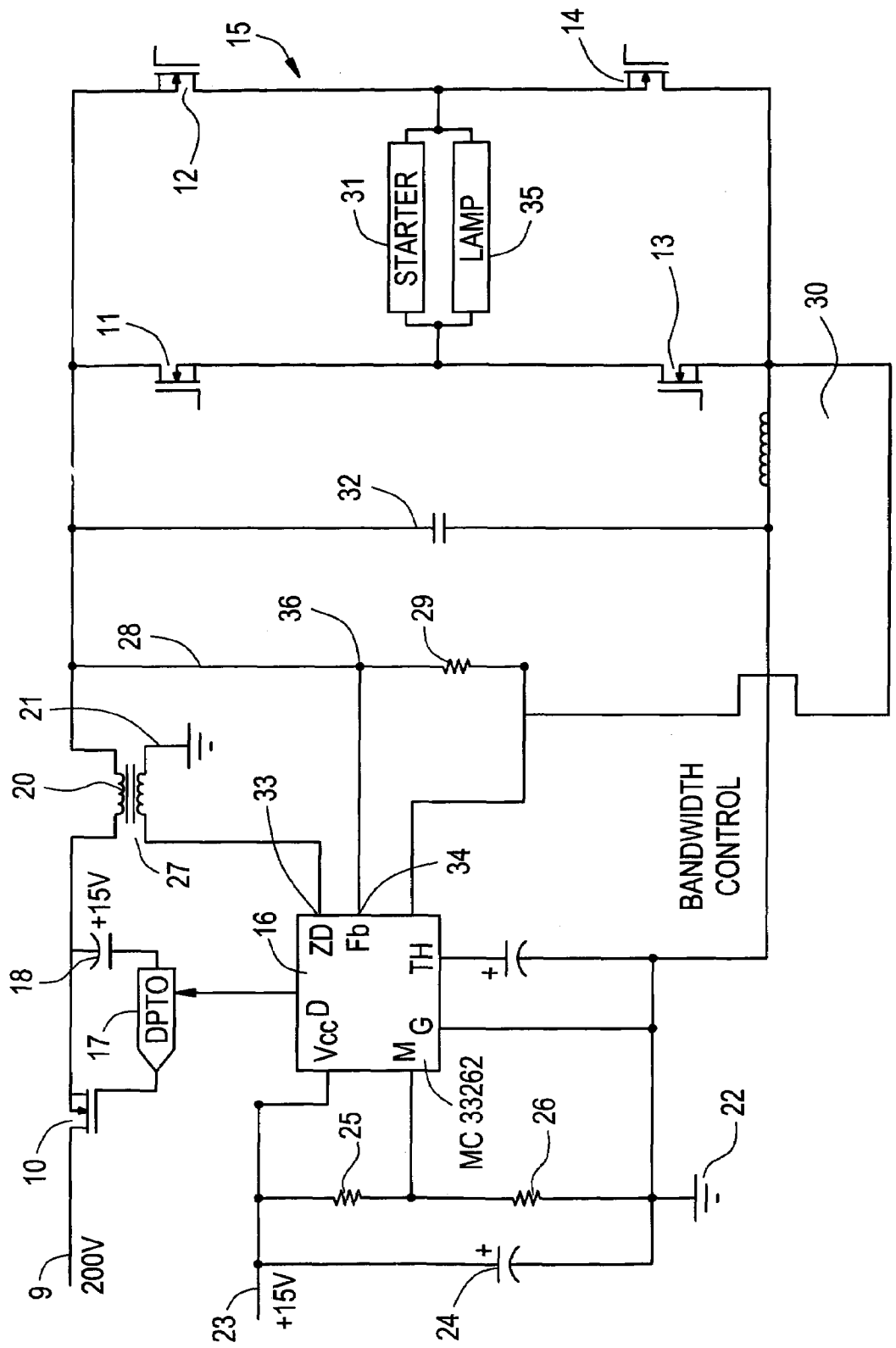
FIG. 1 is a simplified circuit diagram of the control section of the preferred embodiment of the present invention and
FIG. 2 is a circuit diagram of the entire ballast circuit.
Figure 2:
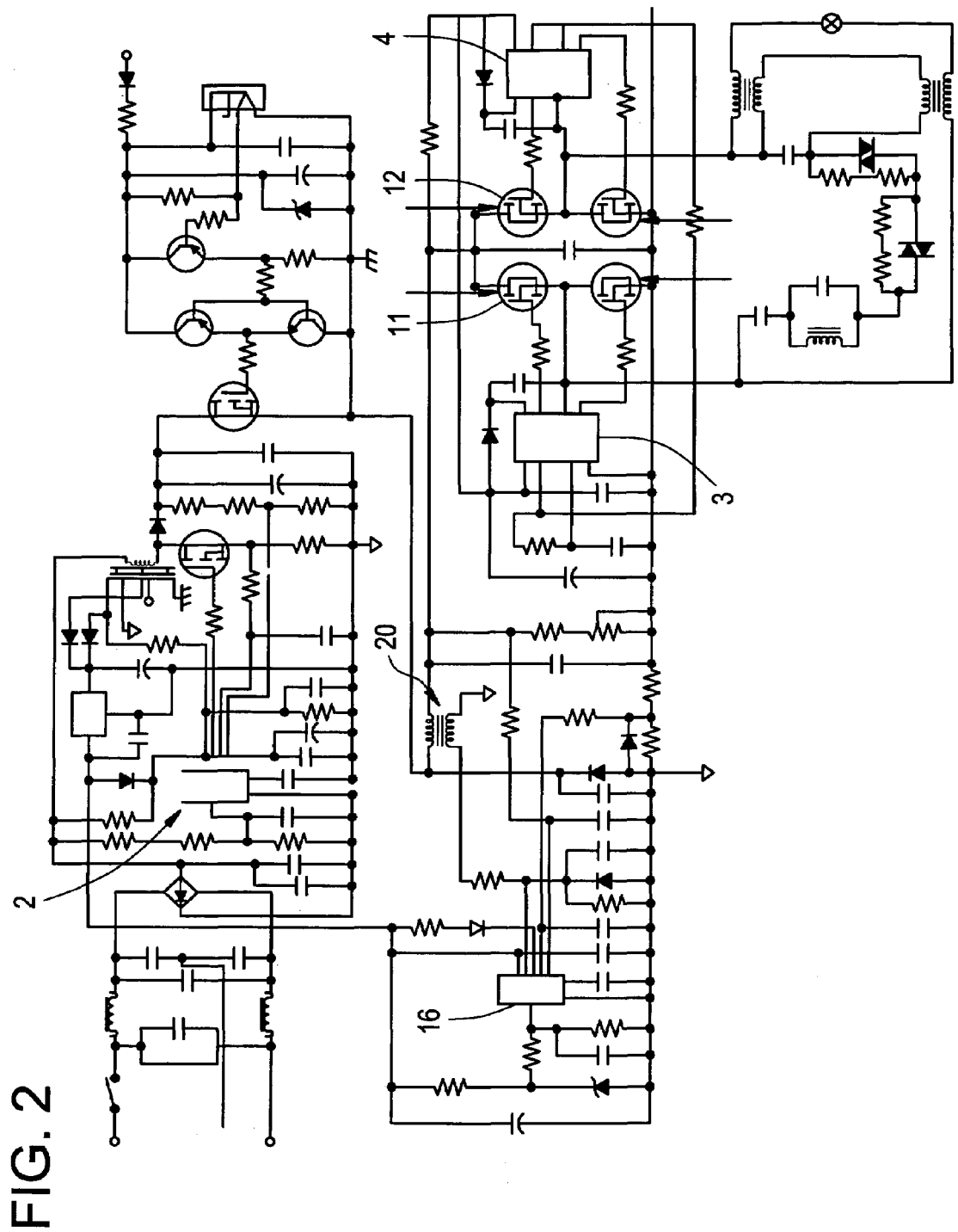

As shown in FIG. 1, the circuit of the embodiment of the present invention uses conventional electronic components, such as ICs (Integrated Circuits), transistors, resistors, capacitors, an inductor and a starter all of which are preferably mounted and interconnected on a printed circuit board (PCB) in a sealed case (See FIG. 2).

Preferably the transistor (10) and the transistors (11–14) of the four-arm bridge (15) are field effect transistors (FETs), more specifically they are preferably metal oxide semiconductor field effect transistors (MOSFETs). An integrated circuit (IC) (See FIG. 2) is selected to have sufficient drive output power to directly drive the MOSFETs (11–14) of the bridge (14).

The preferred integrated circuit (IC) (16) is MC 33262 (available from Onsemi and described at internet http: onsemi.com; publications AND 8123/D and MC 34262/D). It is a monolithic control IC for active power factor correction (APFC). That IC has been described/utilized in a series of U.S. patents including U.S. Pat. No. 5,869,937 to Konopka. A separate IC is used as a PFC preconverter in which it provides power for the controller and bridge (15), which is the polarity-reverser. The drive output of the IC (16) has about 500 mA peak current with a typical rise and fall time of 50 ns (nanoseconds) with 1.0 nF (nano Farad) load (See FIG. 2 for PFC and bridge details).

The relationship between the pin connections of the MC33262 and the pin connections (terminals) as shown in FIGS. 1 and 2 is as follows: Vcc is pin 8 (power); M is pin 3 ("Multiplier Input"); G is pin 6 ("Gnd—ground or common"); TH is pin 4 current sense ("Current Sense Input"); Fb is pin 1 (Vf—"Voltage Feedback Input"), ZD is Pin 5 (ZERO—zero crossing detector) and Pin 7 (DO—"Drive Output") and Pin 2 is bandwidth control (COMP—compensation). As shown in FIG. 1 the circuit includes a line source (9) for a source of regulated 200V DC voltage, from a conventional DC power supply (PFC shown in FIG. 2). The source (9) is connected to FET (10) controlled by OPTO (17), powered by a floating power supply. Capacitor (18) is connected to a 15V DC line from the power supply (PFC shown in FIG. 2). OPTO (17) is an electrical isolation optical coupler which provides isolation between IC (16) and FET (10).

The FET (10) is also connected to one side (coil) of transformer (20). The primary of the transformer (20) is the inductor in the circuit. Terminal (21) of the secondary side of transformer (20) is connected to ground (22). The IC (16), at its terminal Vcc, is connected to a 15V line (23) which is connected through capacitor (24) to ground (common) (22). The IC (16) terminal M is connected to the tap of a voltage divider which consists of resistors (25 and 26). The terminal ZD—zero crossing detector terminal—of IC (16) is connected to (27) of transformer (20).

The feedback terminal Fb of IC (16) is connected to the tap of voltage divider (36) in series with R—current sense resistor—(30). This is proportional to the voltage, Vlamp, applied to the load, i.e., the voltage applied to the lamp (35) (the resistors (28 and 29)) form the voltage divider (36) plus the added voltage generated by current sense resistor, R (30).

The voltage across R (30), which is R26 and R27 of FIG. 2, only is connected to the threshold detector of the MC33262 and controls the duration of the drive to the FET (10) on a cycle-by-cycle basis. The lamp voltage (Vlamp) and the lamp current (Ilamp) are both sensed as voltages by current sense resistor, R (30) added to divider (36). The four-arm bridge (15) is a low-frequency converter. which reverses voltage through the lamp (35). The bridge (15) is connected to the starter and the load (lamp 35). The MOS-FETS) (11–14) are typically discreet transistors. The starter (31), preferably a high-performance, durable starter, is connected in the bridge (15). The capacitor (32) is in parallel with bridge (15), but is not a large, bulk storage capacitor; for example it is 1ufd 400 DC.

Some of the circuitry described above may be considered conventional in electronic ballast design, particularly the MOSFET bridge, the starter and the use of integrated circuits as the controller for the power factor corrector (PFC), and polarity reversal (See FIG. 2).

The present invention is particularly directed to the feedback system to control the output of the integrated circuit (IC) (16) in FIG. 1.

The IC (2) in FIG. 2, controlling the power supply/power factor corrector (PFC), provides regulated 200 V and two regulated 15 V power supplies. Preferably IC (2) in FIG. 2 is also MC33262. The bridge (15) in FIG. 1, is driven by two ICs, (3) and (4) in FIG. 2, which are preferably IR 2151 and IR 2111, which are half-bridge "totem pole" drivers, preferably from International Rectifier.

The IC (16) in FIG. 1 operates a quasi-continuous conduction mode which means that power is applied to the load, i.e., lamp, until the load current reaches a predetermined level ("shut-off threshold"). Then power is disconnected and the stored inductive energy is discharged through the load and through a diode (not shown) until the discharge current falls to zero. To avoid oscillation, power is reapplied just before the discharge current reaches zero to minimize electrical noise. The continuous load/unload operation provides maximum use of the energy storage capacity of the inductor storage, so that the inductor may be relatively small, light and low in cost.

To accomplish this operation the IC (16) must receive appropriate information ("feedback") as to the inductor current and the discharge current. The inductor current feedback is preferably from sense resistor (30), which is a current sense resistor in series with the inductor current (transformer (20) primary.)

The two information signals (inductor current and lamp voltage) are combined to form a control feedback signal, which signal is transmitted to an error amplifier (pin 1—f.b.) with an input filter (See FIG. 2). The error amplifier is preferably part of the IC (16) and is connected internally to its terminal Fb. The error amplifier in the MC 33262 has a typical gain of 100 umhos and generates an internal amplified feedback signal. IC (16) has an internal reference which is compared to the amplified feedback signal which is 2.5V DC fixed.

It may be thought that the ideal feedback signal would be based on power, which is the product of lamp voltage multiplied by lamp current. However, power feedback is difficult to implement in an economically feasible way. Lamp voltage is reversing periodically, typically at 150 Hz. A simple feedback system would measure only the lamp current. If the lamp current rises (higher feedback signal) the voltage would be reduced but not directly proportional to the power.

It is also possible to derive a feedback signal from the voltage applied to the lamp. However, an increase in lamp current may, with such voltage feedback, result in a decrease in operating voltage (negative impedance), which may result in an "unballasted" runaway power increase.

It is thus seen that a power-derived feedback signal, while difficult to implement economically, is a preferred approach.

The present invention presents a feedback method and system which approximates the control advantages of a power derived feedback signal, but is economical and feasible to implement.

A signal is obtained, which is derived from the lamp current. The average of the waveform is used. It is a close approximation of the RMS current, which is 1.5 amperes for a 150 watt lamp operating at 100 volts.

For the purpose of this analysis, one examines the lamp supply voltage before it passes through the polarity-reversing bridge (15) and one ignores polarity-reversal. The frequency of the power control switcher is generally much higher than the lamp-reversal frequency. That current, through the inductor, is detected by sense resistor (30), which is connected in series with the voltage divider (36) to the feedback terminal Fb of IC (16). The feedback signal to terminal Fb, is the lamp voltage plus the approximate lamp current. This not a power-derived feedback (voltage multiplied by current), but is a sufficiently close approximation to power to provide, in prototype tests, excellent ballast operation over more than the expected range of lamp parameters.

CONDITIONS OF THE EXAMPLES 1–3

The feedback voltage (Fb) at point (36) is a composite of V Lamp (lamp voltage) plus approximately I Lamp (Lamp amperage). Fb is sensed as a voltage through R sense (sense resistor (30)) and called herein "V-R sense". The current that is sensed at R sense resistor (30) is actually the current through the inductor transformer (20) (L), but the average value is a close approximation of RMS I Lamp through the lamp. The system bandwidth is set at about 20 Hz, well below the polarity-reversal frequency produced by the bridge (15), for example at 150 Hz, and far below the control switcher operating frequency (switching frequency), for example of 35 KHz.

Example 1

In this Example 1 sense resistor (30) is 1 ohm; voltage divider (36) (resistors 28:29) across capacitor (32) has a ratio of 100:1, the voltage across capacitor (32) is 100 volts because a 150 Watt lamp typically operates at 100 volts. I Lamp (lamp current) is 1.5 amps, and V-R sense (voltage across sense resistor (30)) is 100 divided by 1 (ratio of voltage divider) is Vd 1 volt. Vd (1 volt) plus I Lamp (1.5) totals to 2.5 volts, which is set as to equal the internal reference voltage (2.5 volts) of IC (16). In other words, the voltage divider ratio is selected by the circuit designer, so that at proper operation, the composite feedback signal to Fb equals the reference voltage of IC (16).

Example 2

The lamp is an aged S-56 HPS lamp in which the electrodes are worn. The V Lamp is 150 volts, much higher than in Example 1 above. Vc across capacitor (32) is 150 volts; V-R sense (across sense resistor (30)) is therefore adjusted by the feedback to be 1 volt (I Lamp=1 amp) so that f.b=1.5+1=2.5V. The lamp is operated at 150 volts and 1 amp to provide 150 Watts of power consumption.

Example 3

The lamp is a S-55 lamp which by error replaces a S-56 lamp. The S-55 has a nominal 55-volt operating voltage but would likely operate at about 60 volts because of reduced beam current with the above-described ballast of FIG. 1. In this Example Vd=0.6 volts (60/100); I-R sense is adjusted by the feedback loop (Fb) to 1.9 amps, i.e., 0.6+1.9=2.5V. The voltage at R sense resistor (30) (1.9 volts) plus Vd (at tap of voltage divider (36)) at 0.6 volts gives a total feedback voltage Fb of 2.5 volts, which equals the reference voltage of IC (16). In this Example the power is 60 volts×1.9 amps or 114 Watts, which is a reduced power consumption. The lamp would still operate although with a reduced light output, even under totally abnormal conditions.

Although the examples above utilize HPS bulbs, the ballast of the present may be useful in controlling and regulating other fluctuating and/or non-linear loads, such as certain motors, HID lamps (not only HPS lamps), arrays of LEDs (Light Emitting diodes), fluorescent lighting and electrochemical systems.

The particular IC discussed above is the MC 33262. However, other ICs or discreet designs may alternatively be used and the present invention is useful with other control configurations such as pulse-rate modulation (PRM), pulse width modulation (PWM), delta modulation, etc. The patents, patent applications and other references mentioned above are incorporated by reference herein.

What is claimed is:

1. An electronic ballast to regulate power to a load, comprising:
   A. An integrated circuit (IC) having a driving terminal, the integrated circuit being adapted to generate a train of high-frequency drive pulses at said driving terminal; a feedback terminal and an internal reference voltage; the integrated circuit being adapted to compare a feedback signal received at its feedback terminal with the reference voltage and to adjust the duration of said drive pulses via the input according to said comparison;
   B. a polarity-reversing bridge connected between the drive terminals and the load, the bridge being driven by separate drive signals and generated by a pair of integrated circuits and providing low-frequency polarity-reversal of the load;
   C. a feedback system connected to the feedback terminal and to the load, the feedback system deriving an average feedback signal from current consumed by the load combined with a voltage feedback signal from voltage impressed on the load, the feedback system combines, by addition, the current and voltage feedback signals to provide said composite feedback signal to the feedback terminal.

2. An electronic ballast as in claim 1, which ballast further comprises a switch-controlled inductor connected between the load and a source of regulated DC power; wherein the current feedback signal is derived from current through the inductor.

3. An electronic ballast as in claim 1 and the ballast further including a voltage divider having two opposite ends, which voltage divider establishes a ratio of load voltage feedback added to current feedback.

4. An electronic ballast, as in claim 1, and the ballast further including a starter means connected to the bridge and to the load to start ignition of an arc.

5. An electronic ballast, as in claim 1, wherein the bridge comprises four metal oxide field/effect transistors (MOSFETS).

6. An electronic ballast, as in claim 1, wherein the load is a high pressure sodium (BPS) lamp.

7. An electronic ballast, as in claim 1, wherein the load is a square wave waveform and the bridge generates a symmetric current waveform.

8. The method of operation of an electronic ballast to regulate power to a load, comprising:
   A. The ballast incorporating an integrated circuit (IC) having a driving terminal, the integrated circuit being adapted to generate a train of high-frequency drive pulses at said driving terminal; a feedback terminal and an-internal reference voltage; the integrated circuit comparing a composite feedback signal received at its feedback terminal with the reference voltage and to adjusting the drive pulses accordingly to minimize the error of said comparison;
   B. The ballast further containing a bridge connected between the drive terminal and the load, the bridge being driven by drive signals and generating symmetric polarity-reversal power to the load;
   C. The ballast further comprising a feedback system connected to the feedback terminal and to the load, the feedback system deriving an average current feedback signal from current consumed by the load and deriving a voltage feedback signal from voltage consumed by the load; the feedback system combining, by addition, the current and voltage feedback signals and providing said composite feedback signal to the feedback terminal.

9. The method of operating an electronic ballast, as in claim 8, which ballast further comprises a switched inductor connected to the load and a source of regulated DC power switch connected to the inductor; wherein the current feedback signal is derived from the average current through the inductor.

10. The method of operating an electronic ballast, as in claim 8, and the ballast further including a voltage divider having two opposite ends, which voltage divider establishes a ratio of voltage feedback to current feedback; and a current resistor connected to the load to sense current consumed by the load.

11. The method of operation an electronic ballast, as in claim 8, and the ballast further including a starter means connected to the bridge and to the load to start ignition of an arc.

12. The method of operation of an electronic ballast, as in claim 8, wherein the bridge comprises four metal oxide field/effect transistors (MOSFETS).

13. The method of operation of an electronic ballast, as in claim 8, wherein the load is a high pressure sodium (BPS) lamp, high intensity discharge lamp (HID).

14. The method of operation of an electronic ballast, as in claim 8, wherein the drive current is a square wave waveform and the bridge generates a symmetric current waveform.

15. An electronic ballast to regulate power to a load, comprising:
  A. An integrated circuit (IC) means having a driving terminal to generate a train of drive pulses at said driving terminal; a feedback terminal and an internal reference voltage; the integrated circuit means to compare a feedback signal received at its feedback terminal with the reference voltage and to adjust the drive pulses to minimize the error of said comparison;
  B. a bridge means connected to the drive terminal and to the load, the bridge being driven by separate drive signals to generate low-frequency Polarity-reversal of the load;
  C. a feedback system means connected to the feedback terminal and to the load, the feedback system means to derive an average current feedback signal from current consumed by the load and to derive a voltage feedback signal from voltage applied to the load; the feedback system combining, by addition, the current and voltage feedback signals to provide said composite feedback signal to the feedback terminal.

16. An electronic ballast, as in claim 15, which ballast further comprises a switched inductor connected to the load and a source of regulated DC power switch connected to the inductor wherein the current feedback signal is derived from current through the inductor.

17. An electronic ballast, as in claim 15, and the ballast further including a voltage divider having two opposite ends, which voltage divider establishes a ratio of voltage feedback to current feedback.

18. An electronic ballast, as in claim 15, and the ballast further including a starter means connected to the bridge means and to the load to start ignition of an arc.

19. An electronic ballast, as in claim 15, wherein the bridge comprises four metal oxide fieldeffect transistors (MOSFETS).

20. An electronic ballast, as in claim 15, wherein the load is a high pressure sodium (HPS) lamp, high intensity discharge (HID lamp).

21. An electronic ballast, as in claim 15, wherein the load current is a square wave waveform and the bridge means generates a symmetric current waveform.

* * * * *